May 24, 1927.
F. M. AHEARN
1,629,901
TIRE VALVE
Filed Nov. 27, 1925
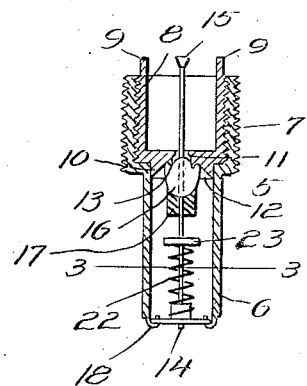
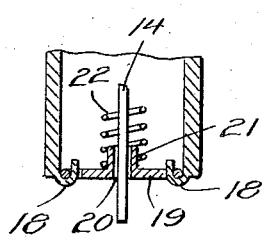
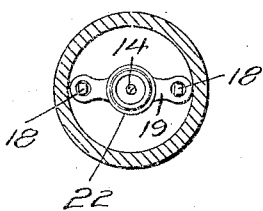
Inventor
F. M. Ahearn.
By Clarence A. O'Brien.
Attorney Patented May 24, 1927.

1,629,901

UNITED STATES PATENT OFFICE.

FRANK M. AHEARN, OF KINDE, MICHIGAN.

TIRE VALVE.

Application filed November 27, 1925. Serial No. 71,700.

This invention relates generally to automobiles pneumatic tires and has more particular reference to a valve construction that is adapted to be disposed within the valve stem of the tire inner tube in order that the same may be properly inflated and air properly maintained therein under pressure.

The primary object of the invention is to substantially improve and simplify this form of tire valve now upon the market, one of the main points of the invention residing in the provision of improved means whereby the air sealing member per se is maintained in positive contact with its cooperating means through the pressure of the air in the tube regardless of the position that said member may take with respect to the seat.

A further and important object is to provide a tire valve of this character wherein the air within the tube may be relieved therefrom in a much quicker manner than is now the case with other types of valves through the conjunction with pneumatic tire inner tubes.

A still further and important object is to provide a tire valve wherein the different parts may be entirely disassembled in order that they may be readjusted or repaired without the necessity of procuring an entirely new valve for insertion in the valve stem of the inner tube.

With the foregoing and other objects in view as the nature of the invention will be better understood, the machine comprises the novel form, combination and arrangement of parts hereinafter more fully described and shown in the accompanying drawings and claimed.

In the drawing wherein like reference characters indicate corresponding parts throughout the several views, Figure 1 is an enlarged detail vertical section of a tire valve constructed in accordance with my invention.

Fig. 2 is a still further enlarged fragmentary section of the lower portion of the valve, and Fig. 3 is a detailed transverse section taken substantially upon the line 3—3 of Fig. 1 and looking downwardly.

Now having particular reference to the drawings, my novel valve constitutes the provision of a metallic shell 5 that includes a lower relatively elongated tubular portion 6 and an upper cup-shaped portion 7 of less length but greater diameter than said portion 6, this portion 7 being internally screw threaded for receiving a threaded cup 8, the upper edge of which is provided with at diametrically opposed points lugs 9—9 in order that the valve when assembled may be properly disposed in conventional inner tube valve stem, the external surface of the upper portion 7 of said shell being threaded throughout its entire length for threaded engagement within said valve stem.

The central portion of the bottom wall of the cup-shaped member 8 is formed with a boss 10 that engages within the upper end of the portion 6 of said shell through which is an air inlet and discharge orifice 11 that is flared outwardly as at 12 upon the face of the lug in order that a valve member hereinafter described may be properly fed into position for closing the orifice 11 after the tire has been properly inflated. Within the orifice 11 there is formed a depending rib 13 for a purpose hereinafter more fully described.

Disposed within the shell and being of a slightly greater length than said shell is a valve pin 14, the upper end of which is conically headed as at 15 for providing a ready means of moving the same in a downward position. Said pin 14 carries at a point beneath the cup orifice 11, a valve member which is the form of a relatively small rubber ball 16, preferably of the shape as is shown. This rubber ball is suitably secured to the stem and in contacting relation with the lower surface thereof and also disposed upon said pin is a block of rubber 17 that provides a piston in order that the pressure of the air may be directed thereagainst for properly seating the valve within the flared portion of the orifice, said valve being formed at its upper end with a circumferential groove for receiving the rib 13 above described which will provide a positive air seal between the flared wall of the orifice and said valve.

The valve is normally maintained in closed position even when the tire is not under pressure thru the medium of expansible spring 22 that surrounds the stem at its lower end between an abutment 23 and a cross plate 19 at the lower end of the portion 6 of the shell. This cross plate is provided at its opposite end with openings within which are engaged hook-like pins 18—18 formed upon the lower end of the shell 6 at diametrically opposed points. For maintaining the spring in position said cross plate is formed concentric with the opening 20 with a sleeve 21 through which the pin 14 extends, the said sleeve having the added purpose of guiding the pin in relatively true vertical movement which further assists in the proper seating of the valve with respect to the discharge orifice.

From the foregoing description when considered in conjunction with the accompanying drawings, it will be apparent that I have provided a highly novel and simple form of tire valve, and one wherein the parts thereof may be readily disassembled for repairs, renewal or changing purposes and one wherein a relatively positive seal will at all times be provided for preventing an escape of the air in the tire.

Minor changes may be made in the invention without departing from the spirit and scope of the appended claim.

Having thus described my invention, what I claim as new and desire to secure by Letters Patent is:

In a tire valve of the character described, a hollow tubular shell adapted for association within the inner tube valve stem, a cup-shaped member disposed within the upper end of the shell and provided in the bottom wall thereof with a bore providing an air inlet and discharge orifice, a valve pin extending through the shell, a valve member carried by the pin beneath said orifice, the pressure of the air within the tire acting against the valve for maintaining the same in a seated position against the orifice, and additional means for holding the valve closed, said means comprising a cross plate arranged within the lower end of the tubular shell, said cross plate being provided at diametrically opposite points with openings, and a central opening through which the lower end of the valve stem projects, upwardly disposed hook-like pins extending inwardly from the lower end of the shell at diametrically opposite points and adapted for engagement with the respective diametrically opposed openings formed in the cross plate, for supporting the latter, an abutment arranged on the valve stem below the valve, and an expansible coil spring encircling the valve stem and interposed between the cross plate and said abutment.

In testimony whereof I affix my signature.

FRANK M. AHEARN.